United States Patent
Pan

(10) Patent No.: US 10,408,434 B2
(45) Date of Patent: Sep. 10, 2019

(54) CONNECTING STRUCTURE AND LED DISPLAY DEVICE HAVING THE SAME

(71) Applicant: SHENZHEN LEYARD OPTO-ELECTRONIC CO., LTD., Shenzhen (CN)

(72) Inventor: Xitian Pan, Shenzhen (CN)

(73) Assignee: SHENZHEN LEYARD OPTO-ELECTRONIC CO., LTD., Shenzhen (CN)

(*) Notice: Subject to any disclaimer, the term of this patent is extended or adjusted under 35 U.S.C. 154(b) by 462 days.

(21) Appl. No.: 15/268,018

(22) Filed: Sep. 16, 2016

(65) Prior Publication Data

US 2017/0211786 A1 Jul. 27, 2017

(30) Foreign Application Priority Data

Jan. 22, 2016 (CN) .......................... 2016 1 0045848

(51) Int. Cl.
  *F16B 5/00* (2006.01)
  *F16B 21/00* (2006.01)
  (Continued)

(52) U.S. Cl.
  CPC ............ *F21V 17/10* (2013.01); *F16B 5/0084* (2013.01); *F16B 5/0657* (2013.01); *F16B 21/02* (2013.01);
  (Continued)

(58) Field of Classification Search
  CPC ...... F16B 21/073; F16B 21/18; F16B 5/0084; F16B 5/0092; F16B 5/0657; F16B 21/02;
  (Continued)

(56) References Cited

U.S. PATENT DOCUMENTS 2,385,709 A * 9/1945 Johnston ................... B25B 9/00
  24/600.6
4,970,954 A * 11/1990 Weir ........................ B41K 1/42
  101/104
(Continued)

FOREIGN PATENT DOCUMENTS

CN 204113825 U * 1/2015
CN 204371847 U * 6/2015
CN 204991048 U * 1/2016

*Primary Examiner* — Matthew R McMahon
(74) *Attorney, Agent, or Firm* — Alston & Bird LLP

(57) ABSTRACT

The invention provides a connecting structure and a Light-Emitting Diode (LED) display device having the same. The connecting structure comprises: a first pressing plate, which including a plate body and a lock sheet provided on the plate body slidably, a first mounting hole is provided on the plate body; a second mounting hole is provided on a second pressing plate; a connecting column, penetrating through the first mounting hole and the second mounting hole respectively, a lock groove matched with the lock sheet is provided on a first end of the connecting column, a force application part located below the second pressing plate is provided on a second end of the connecting column; a lifting mechanism, connected to the second pressing plate, the second pressing plate may move towards or away from the first pressing plate under an action of the lifting mechanism by operating the force application part.

19 Claims, 10 Drawing Sheets

(51) Int. Cl.
*F21V 17/10* (2006.01)
*F16B 5/06* (2006.01)
*F16B 21/02* (2006.01)
*F16B 21/07* (2006.01)
*F16B 21/09* (2006.01)
*F16B 21/16* (2006.01)
*G09F 9/302* (2006.01)
*G09F 9/33* (2006.01)

(52) U.S. Cl.
CPC ............ *F16B 21/073* (2013.01); *F16B 21/09* (2013.01); *F16B 21/16* (2013.01); *G09F 9/3026* (2013.01); *G09F 9/33* (2013.01); *Y10T 403/595* (2015.01)

(58) Field of Classification Search
CPC .......... F16B 21/09; F16B 21/16; F21V 17/10; Y10T 403/595; G09F 9/3026; G09F 9/33
See application file for complete search history.

(56) References Cited

U.S. PATENT DOCUMENTS

| | | | | |
|---|---|---|---|---|
| 5,499,432 | A * | 3/1996 | Terada | F16B 45/00 24/599.2 |
| 5,518,332 | A * | 5/1996 | Katoh | F16B 21/16 285/305 |
| 6,948,824 | B2 * | 9/2005 | Miwa | G01D 11/28 362/23.13 |
| 7,241,096 | B2 * | 7/2007 | Smith | F16B 21/18 361/726 |
| 8,322,001 | B2 * | 12/2012 | Ehrhardt | B60R 13/0206 24/289 |
| 8,453,973 | B2 * | 6/2013 | Costabel | F16B 5/0628 244/119 |
| 9,534,620 | B2 * | 1/2017 | Courtin | F16B 5/065 |
| 9,976,587 | B2 * | 5/2018 | Heimann | F16B 21/078 |
| 2015/0020644 | A1 * | 1/2015 | Lipschitz | G05G 1/08 74/543 |

* cited by examiner

CONNECTING STRUCTURE AND LED DISPLAY DEVICE HAVING THE SAME

TECHNICAL FIELD OF THE INVENTION

The invention relates to the technical field of display devices, and in particular to a connecting structure and a Light-Emitting Diode (LED) display device having the same.

BACKGROUND OF THE INVENTION

Boxes of an LED display screen in the traditional art are connected via a threaded structure. Consequently, when the boxes are mounted and dismounted, it is necessary to use tools such as a wrench, thereby making the steps of mounting and dismounting the boxes complicated, which causes low assembly efficiency.

SUMMARY OF THE INVENTION

A main objective of the invention is to provide a connecting structure and an LED display device having the same, which are intended to solve the problem in the prior art that it is complicated to splice boxes of an LED display screen.

To this end, according to one aspect of the invention, a connecting structure is provided, which comprises: a first pressing plate, the first pressing plate comprising a plate body and a lock sheet provided on the plate body slidably, a first mounting hole is provided on the plate body; a second pressing plate, a second mounting hole is provided on the second pressing plate; a connecting column, penetrating through the first mounting hole and the second mounting hole respectively, a lock groove matched with the lock sheet is provided on a first end of the connecting column, a force application part located below the second pressing plate is provided on a second end of the connecting column; and a lifting mechanism, connected to the second pressing plate, the second pressing plate may move towards or away from the first pressing plate under an action of the lifting mechanism by operating the force application part.

Furthermore, the force application part is a handle, a sleeve is provided on the surface, away from the first pressing plate, of the second pressing plate so as to form the lifting mechanism, a spiral lifting groove extending in a circumferential direction of the sleeve is provided on a side wall of the sleeve, and the handle penetrates out of the spiral lifting groove, wherein distances between two ends of the spiral lifting groove and the second pressing plate are unequal.

Furthermore, a first positioning structure is provided between the handle and the sleeve.

Furthermore, a third mounting hole extending in a horizontal direction is provided at a second end of the connecting column, the handle penetrates into the third mounting hole, and the first positioning structure comprise: a first positioning groove, provided on an inner side wall of the sleeve; and a first positioning bead, partially provided in the third mounting hole, a first reset member is provided between the first positioning bead and the handle, the first positioning bead abuts against the inner side wall of the sleeve.

Furthermore, a mounting groove with an opening provided at one end is provided on a lower surface of the plate body, the lock sheet is inserted into the mounting groove through the opening, and a second reset member is provided between the plate body and the lock sheet.

Furthermore, a lock hole matched with the lock groove is provided on the lock sheet, and the lock hole corresponds to the first mounting hole.

Furthermore, a notch portion is provided on a hole wall of the lock hole.

Furthermore, a guide groove and a second positioning groove connected with each other are provided on the lock sheet, wherein the second positioning groove is provided at a bottom of the guide groove. The connecting structure further comprises a second positioning structure, and the second positioning structure comprises: a cylinder, one end of the cylinder is provided with a fourth mounting hole; a second positioning bead, partially provided in the fourth mounting hole; and a third reset member, provided between the cylinder and the second positioning bead, wherein the cylinder is matched with the guide groove, and the second positioning bead abuts against the bottom of the guide groove.

Furthermore, there are two reset members, the second reset members are springs, spring mounting holes are provided at two sides of the lock sheet, and the springs are provided in the spring mounting holes.

Furthermore, a operating vertical plate is provided on the lock sheet.

Furthermore, an inclined guide plane is provided at the first end of the connecting column.

According to another aspect of the invention, an LED display device is provided, which comprise a plurality of boxes and a connecting structure provided between adjacent boxes, the connecting structure is the above connecting structure.

By applying the technical solution of the invention, a first pressing plate is fixedly provided on a box, and a second pressing plate is fixedly provided on another box. When the adjacent boxes are mounted, a connecting column penetrates through a first mounting hole, and then a lock sheet is clamped into a lock groove so as to lock a first end of the connecting column. A force application part located below the second pressing plate is operated, and a lifting mechanism drives the second pressing plate to move up, thereby locking the adjacent boxes. The process of mounting the boxes is simple in operation without other mounting tools, and therefore the technical solution of the invention solves the problem in the prior art that it is complicated to splice boxes of an LED display screen.

BRIEF DESCRIPTION OF THE DRAWINGS

The drawings of the specification, forming a part of the invention, are used to provide further understanding of the invention. The schematic embodiments and illustrations of the invention are used to explain the invention, and do not form improper limits to the invention. In the drawings.

Figure 1:
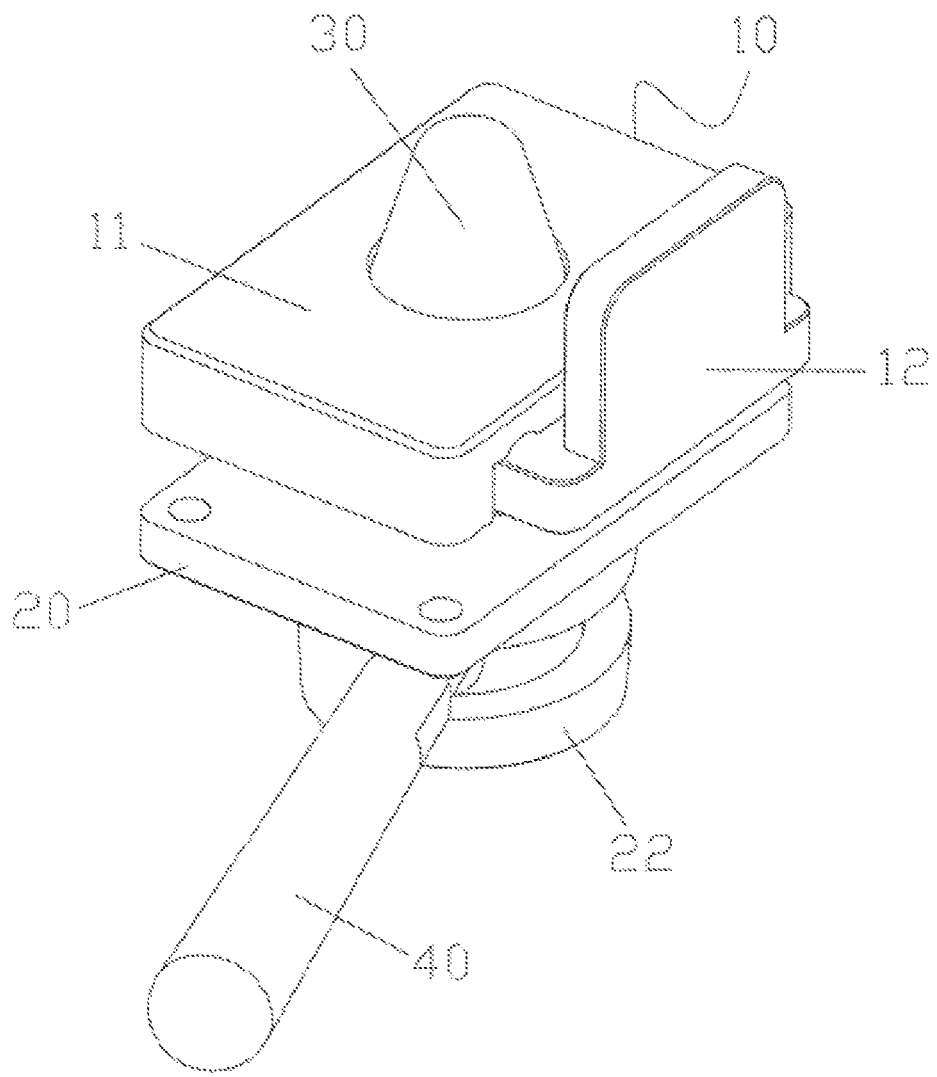
FIG. 1 shows a stereo structure diagram of an embodiment for a connecting structure according to the invention.
Figure 2:
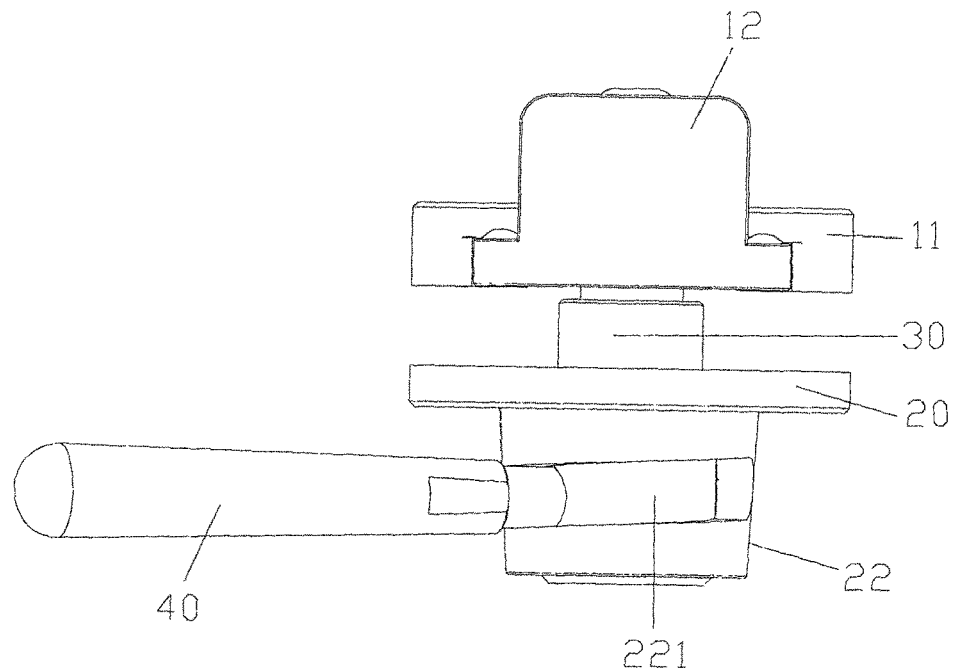
FIG. 2 shows a front view of a connecting structure in FIG. 1.
Figure 3:
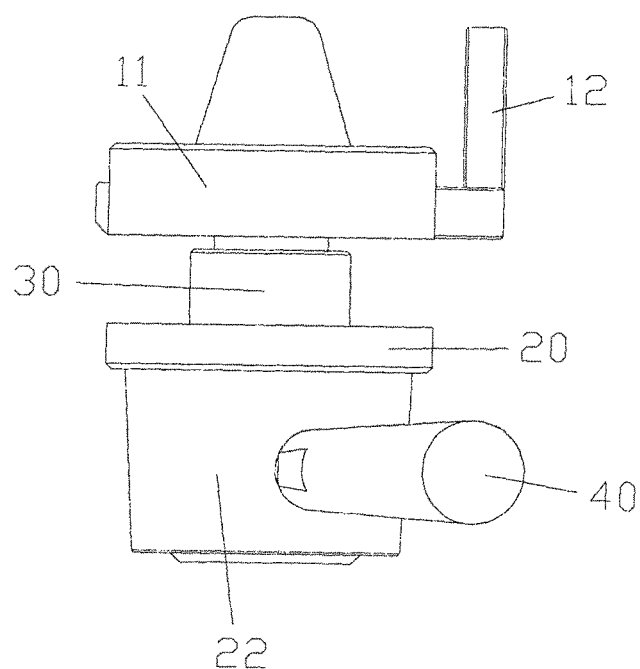
FIG. 3 shows a left view of a connecting structure in FIG. 1.

Wherein, the drawings include the following drawing marks:

10, first pressing plate; 11, plate body; 111, first mounting hole; 112, mounting groove; 12, lock sheet; 121, second reset member; 122, lock hole; 123, guide groove; 124, second positioning groove; 125, spring mounting hole; 126, operating vertical plate; 20, second pressing plate; 21, second mounting hole; 22, sleeve; 221, spiral lifting groove; 30, connecting column; 31, lock groove; 32, third mounting hole; 33, inclined guide plane; 40, force application part; 61, first positioning groove; 62, first positioning bead; 63, first reset member; 70, second positioning structure; 71, cylinder; 711, fourth mounting hole; 72, second positioning bead; 100, box; and 200, connecting structure.

DETAILED DESCRIPTION OF THE EMBODIMENTS

It is important to note that the embodiments of the invention and the characteristics in the embodiments can be combined under the condition of no conflicts. The invention will be illustrated below with reference to the drawings and the embodiments in detail.

As shown in FIG. 1 to FIG. 4, a connecting structure of the present embodiment comprises a first pressing plate 10, a second pressing plate 20, a connecting column 30 and a force application part 40. Wherein the first pressing plate 10 comprises a plate body 11 and a lock sheet 12 provided on the plate body 11 slidably, and a first mounting hole 111 is provided on the plate body 11. A second mounting hole 21 is provided on the second pressing plate 20. The connecting column 30 penetrates through the first mounting hole 111 and the second mounting hole 21 respectively, a first end of the connecting column 30 is provided with a lock groove 31 matched with the lock sheet 12, and a second end of the connecting column 30 is provided with the force application part 40 located below the second pressing plate 20. The connecting structure further comprises a lifting mechanism, the lifting mechanism is connected to the second pressing plate 20, and the second pressing plate 20 may move towards or away from the first pressing plate 10 under an action of the lifting mechanism by operating the force application part 40.

By applying the technical solution of the present embodiment, the first pressing plate 10 is fixedly provided on a box, and the second pressing plate 20 is fixedly provided on another box. When the adjacent boxes are mounted, the connecting column penetrates through the first mounting hole 111, and then the lock sheet 12 is inserted into the lock groove 31 so as to lock the first end of the connecting column 30. The force application part 40 located below the second pressing plate 20 is operated, and the lifting mechanism drives the second pressing plate 20 to move up, thereby locking the adjacent boxes. A process of mounting the boxes is simple in operation without other mounting tools, and therefore the technical solution of the present embodiment solves the problem in the prior art that it is complicated to splice boxes of an LED display screen.

As shown in FIG. 2, FIG. 3, FIG. 9 and FIG. 10, in the technical solution of the present embodiment, the force application part 40 is a handle, and a sleeve 22 is provided on a surface, away from the first pressing plate 10, of the second pressing plate 20 so as to form the lifting mechanism, wherein a spiral lifting groove 221 extending in a circumferential direction of the sleeve 22 is provided on a side wall of the sleeve 22, the handle penetrates out of the spiral lifting groove 221, and distances between two ends of the spiral lifting groove 221 and the second pressing plate 20 are unequal. When it is necessary to lock a box, the handle is pivoted and rotated from a higher end of the spiral lifting groove 221 to a lower end (that is, the handle is rotated from right to left in FIG. 2). In this case, the first end of the connecting column 30 is locked by the lock sheet 12, such that the connecting column is fixedly provided with respect to the first pressing plate 10. Under the action of the spiral lifting groove 221, the second pressing plate 20 moves up with respect to the connecting column 30, that is, when the handle is pivoted leftwards, a distance between the first pressing plate 10 and the second pressing plate 20 is gradually reduced to achieve a compression effect. When it is necessary to dismount the box, the handle is reversely rotated.

The movement of the second pressing plate 20 in the present embodiment is achieved by the spiral lifting groove 221. Certainly, the movement of the second pressing plate 20 can be achieved by other mechanisms. For instance, a threaded structure is provided between the connecting column 30 and the second pressing plate 20, and when the handle is rotated, a effect of enabling the second pressing plate 20 to move towards the first pressing plate 10 can be achieved. Consequently, a specific structure of the lifting mechanism can be decided according to actual working requirements.

Figure 4:
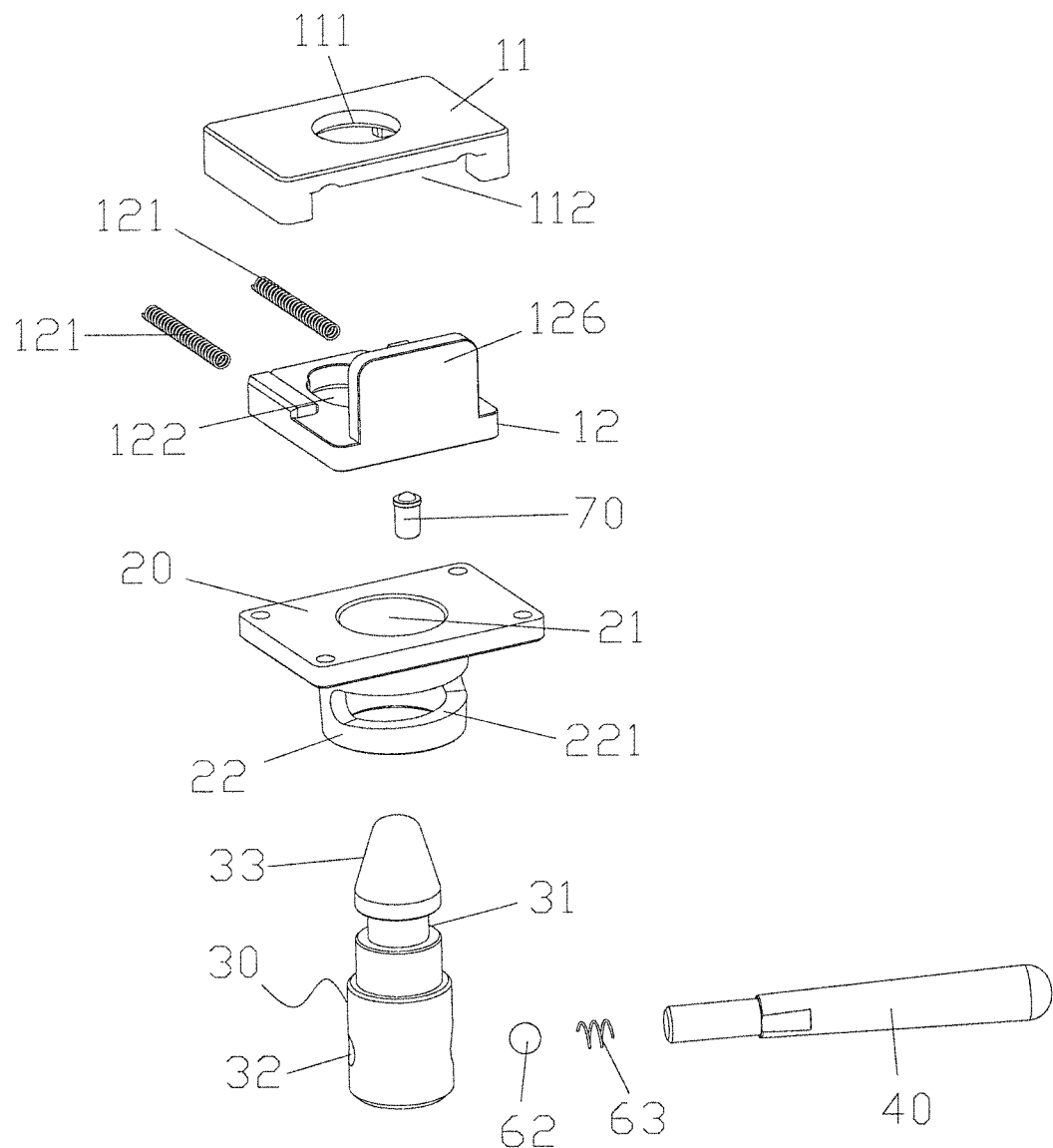
FIG. 4 shows an exploded view of a connecting structure in FIG. 1.
Figure 9:
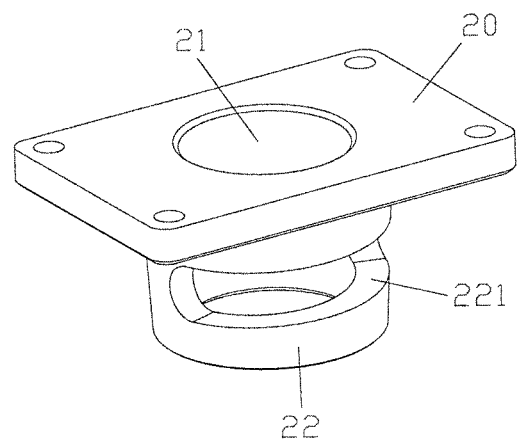
FIG. 9 shows a stereo structure diagram of a first view angle of a second pressing plate in FIG. 1.
Figure 10:
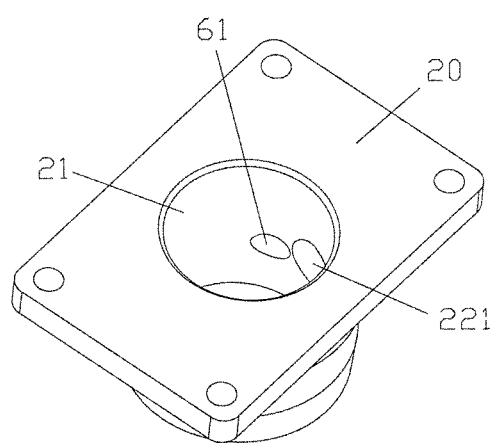
FIG. 10 shows a stereo structure diagram of a second view angle of a second pressing plate in FIG. 1.

In order to make the handle located at a locking position after the box is locked, as shown in FIG. 4, FIG. 9 and FIG. 10, in the technical solution of the present embodiment, a first positioning structure is provided between the handle and the sleeve 22. Specifically, a third mounting hole 32 extending in a horizontal direction is provided at a second end of the connecting column 30, and the handle penetrates into the third mounting hole 32. The first positioning structure comprises a first positioning groove 61 and a first positioning bead 62. The first positioning groove 61 is provided on an inner side wall of the sleeve 22, the first positioning bead 62 is partially provided in the third mounting hole 32, a first reset member 63 is provided between the first positioning bead 62 and the handle, the first positioning bead 62 abuts against the inner side wall of the sleeve 22.

When the handle is rotated, the first positioning bead 62 will form a movement locus on the inner wall of the sleeve 22 correspondingly, and two ends of the movement locus are a locking end and an unlocking end of the handle, respectively. In the present embodiment, when the handle is rotated to a left end, the first positioning bead 62 is located at a right end of the movement locus, and in this case, the first positioning bead 62 is located at the locking end. When the handle is rotated to a right end, the first positioning bead 62 is located at a left end of the movement locus, and in this case, the first positioning bead 62 is located at the unlocking end. Consequently, the first positioning groove 61 shall be provided at the locking end of the movement locus, and when the first positioning bead 62 moves to the locking end, the first positioning bead is inserted into the first positioning groove 61 and the first positioning bead is clamped with the first positioning groove 61. In this case, the handle is stuck and cannot return back, and the first pressing plate 10 and the second pressing plate 20 are always in a clamping locking state. When it is necessary to unlock the box, a force is reversely applied to the handle.

Preferably, the first reset member 63 is a spring. Meanwhile, the first positioning groove 61 is a semispherical groove matched with the first positioning bead 62. The structure enables the first positioning bead 62 to be separated from the first positioning groove 61 by slightly applying a force to the handle when it is necessary to dismount the box, thereby preventing the first positioning groove 61 and the first positioning bead 62 from being stuck to make it difficult to operate.

Preferably, an anti-disengagement structure is provided between the handle and the third mounting hole 32, thereby makes the handle fixing to the connecting column 30. The anti-disengagement structure is an existing structure, and may adopt, for instance, a bolt, a screw or the like, which will not be elaborated herein.

As shown in FIG. 4, in the technical solution of the present embodiment, a mounting groove 112 with an opening provided at one end is provided on a lower surface of the plate body 11, the lock sheet 12 is inserted into the mounting groove 112 through the opening, and a second reset member 121 is provided between the plate body 11 and the lock sheet 12. Wherein, one end of the mounting groove 112 extends to the side wall of the plate body 11, and the lower surface of the plate body 11 is fixedly mounted on the box. The structure enables an accommodating space to be formed between the box and the mounting groove 112, and the accommodating space is provided with an opening located in a side wall of the plate body 11. After the plate body 11 is fixedly mounted on the box, the lock sheet 12 is inserted into the mounting groove 112 through the opening. In order to prevent the lock sheet 12 from being pushed out by the second reset member 121, an anti-disengagement structure is provided between the lock sheet 12 and the plate body 11, and the anti-disengagement structure may adopt a structure in the prior art, for instance, fit between a sliding block and a sliding groove and fit between stop blocks. When the lock sheet 12 is in a natural state, one end of the lock sheet is pushed against by the second reset member 121, and the other end of the lock sheet is limited by the stop structure so as to prevent disengagement.

Figure 5:
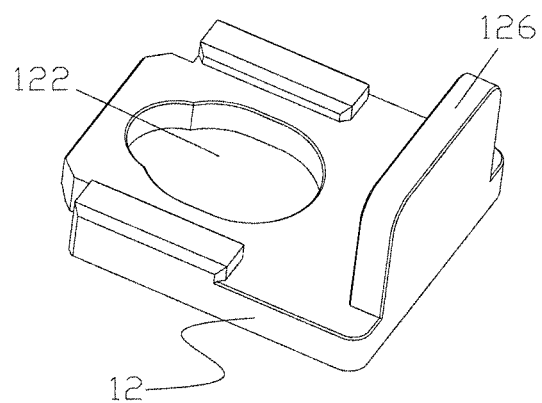
FIG. 5 shows a stereo structure diagram of a first view angle of a lock sheet of a connecting structure in FIG. 1.
Figure 6:
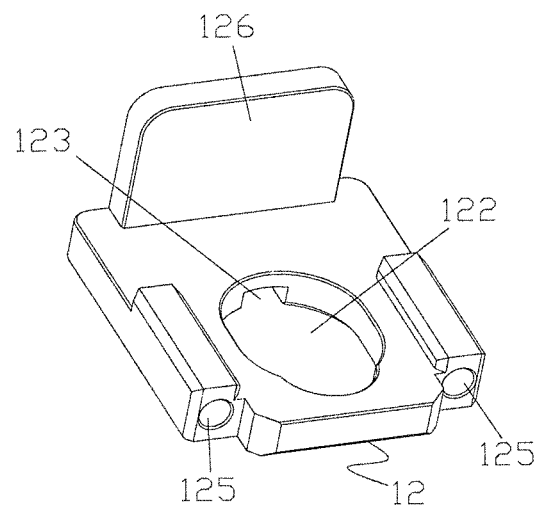
FIG. 6 shows a stereo structure diagram of a second view angle of a lock sheet of a connecting structure in FIG. 1.
Figure 7:
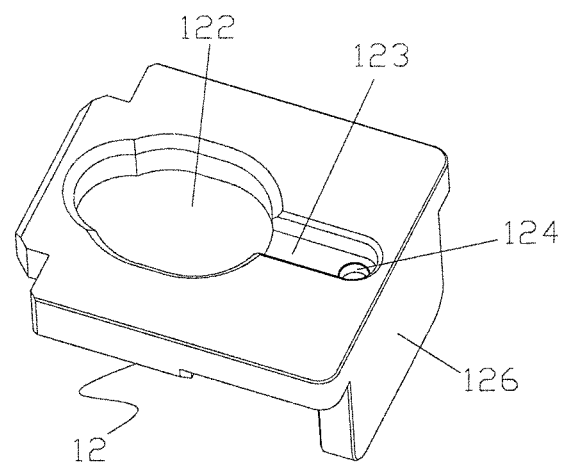
FIG. 7 shows a stereo structure diagram of a third view angle of a lock sheet of a connecting structure in FIG. 1.

As shown in FIG. 5 to FIG. 7, in the technical solution of the present embodiment, a lock hole 122 matched with the lock groove 31 is provided on the lock sheet 12, and the lock hole 122 corresponds to the first mounting hole 111. And preferably, a notch portion is provided on a hole wall of the lock hole 122. Wherein, a size of the lock hole 122 is greater than that of the first end of the connecting column 30, and the connecting column 30 can smoothly pass through the lock hole 122. The notch portion of the lock hole 122 is adaptive to the lock groove 31 to further achieve locking. When it is necessary to mount the box, the lock sheet 12 is pushed to align the lock hole 122 with the first mounting hole 111, such that the first end of the connecting column 30 penetrates through the lock hole 122 and the first mounting hole 111. The lock sheet 12 is loosened, and in this case, the lock sheet 12 returns under the action of the second reset member, and the notch portion clamps the lock groove 31. When the box is dismounted, the above step is reversely operated.

As shown in FIG. 7, in the technical solution of the present embodiment, a guide groove 123 and a second positioning groove 124 connected with each other are provided on the lock sheet 12, wherein the second positioning groove 124 is provided at a bottom of the guide groove 123. Meanwhile, one end of the guide groove 123 extends to the lock hole 122. The connecting structure further comprises a second positioning structure 70, the second positioning structure 70 is fixedly provided below the guide groove 123, and preferably, the second positioning structure is fixedly provided on the box. The second positioning structure 70 comprises a cylinder 71, a second positioning bead 72 and a third reset member, wherein a fourth mounting hole 711 is provided at one end of the cylinder 71; the second positioning bead 72 is partially provided in the fourth mounting hole 711; and the third reset member is provided between the cylinder 71 and the second positioning bead 72, wherein the cylinder 71 is matched with the guide groove 123, the second positioning bead 72 abuts against a bottom of the guide groove 123. The structure enables the lock sheet 12 to automatically keep an unlocking position when the box is dismounted, thereby making it convenient for an operator to take the connecting column 30 out of the first pressing plate 10. The specific operation is as follows.

With reference to FIG. 1, FIG. 4, FIG. 7 and FIG. 11, it can be seen that when the box is dismounted or mounted, the lock sheet 12 is located at three positions. That is, one end of the lock sheet 12 is pushed against by the second reset member 121, the notch portion of the lock sheet 12 is matched with the lock groove 31, and in this case, the lock sheet 12 is located at a locking position; the lock sheet 12 is pushed back, the notch portion is separated from the lock groove 31, and in this case, the lock sheet 12 is located at an unlocking position; and the connecting column 30 is taken out, one end of the lock sheet 12 is pushed against by the second reset member 121, the other end of the lock sheet 12 is positioned by the anti-disengagement structure so as to prevent the lock sheet 12 from disengaging, and in this case, the lock sheet 12 is located at a non-fit position. When the lock sheet 12 moves at the locking position, the unlocking position and the non-fit position, the second positioning bead 72 slides in the guide groove 123 correspondingly, and the second positioning groove 124 is provided at a position corresponding to the second positioning bead 72 when the lock sheet 12 is located at the unlocking position. Specifically, when the lock sheet 12 is pushed from the locking position to the unlocking position, the second positioning bead 72 is clamped into the second positioning groove 124. In this case, the position of the lock sheet 12 is locked, the operator does not need to apply a force to the lock sheet 12 all the time with one hand, and therefore the connecting column 30 can be more conveniently taken out. After the connecting column 30 is taken out, a force is applied to the lock sheet 12 to make it return.

Preferably, the second reset member is a spring, and the second positioning groove 124 is a semispherical groove matched with the second positioning bead 72. The structure enables the second positioning bead 72 to be separated from the second positioning groove 124 by slightly applying a force to the lock sheet 12, thereby preventing the second positioning bead 72 and the second positioning groove 124 from being stuck to make it difficult to take out.

As shown in FIG. 6, in the technical solution of the present embodiment, there are two second reset members 121, the second reset members 121 are springs, spring mounting holes 125 are provided at two sides of the lock sheet 12, and the springs are provided in the spring mounting holes 125. The structure can ensure stress balancing of the lock sheet 12.

As shown in FIG. 5 to FIG. 7, in the technical solution of the present embodiment, a operating vertical plate 126 is provided on the lock sheet 12. The pushing operation on the lock sheet 12 is further facilitated.

Figure 8:
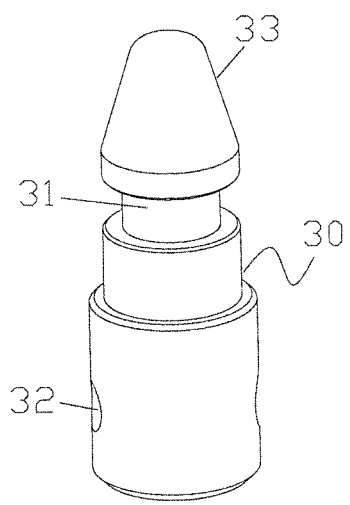
FIG. 8 shows a structural diagram of a connecting column of a connecting structure in FIG. 1.

As shown in FIG. 8, in the technical solution of the present embodiment, an inclined guide plane 33 is provided at the first end of the connecting column 30. It may be convenient for the inclined guide plane 33 to form a thrust to the lock sheet 12 when the first end of the connecting column 30 penetrates into the first mounting hole 111 and the lock hole 122, thereby clamping a notch of the lock sheet 12 into the lock groove 31.

Figure 12:
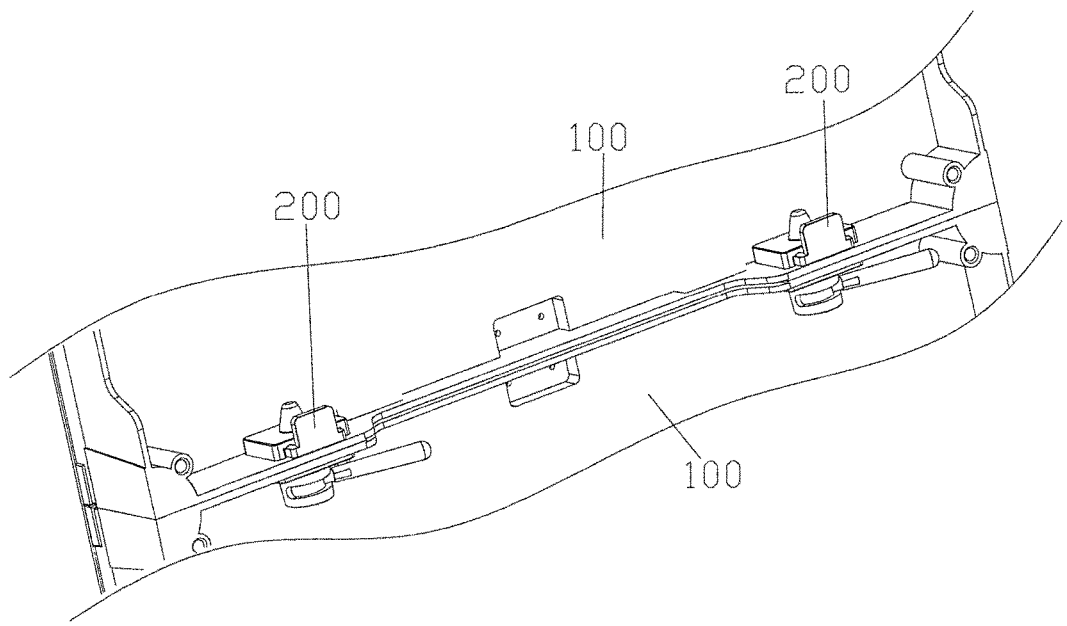
FIG. 12 shows a local structure diagram of an LED display device according to the invention.

The invention also provides an LED display device. As shown in FIG. 12, an embodiment for an LED display device according to the invention comprises a plurality of boxes 100 and a connecting structure 200 provided between the adjacent boxes 100, the connecting structure 200 is the above connecting structure. A method for connecting the boxes 100 of the LED display device according to the invention will be specifically introduced below. In order to facilitate descriptions, the adjacent boxes 100 are divided into a first box and a second box, wherein the first box is located above, and the second box is located below. A first pressing plate 10 is fixedly mounted on the first box, and a second pressing plate 20, a connecting column 30 and a handle are fixedly mounted on the second box. A specific mounting process is as follows.

1. The handle is rotated to an unlocking position, such that the connecting column 30 penetrates through a lock hole 122 and a first mounting hole 111, an inclined guide plane 33 aligns the first box with the second box, and the inclined guide plane 33 will form an unlocking thrust to a lock sheet 12.

2. In a process that the connecting column 30 penetrates through the lock sheet 12, when a lock groove 31 reaches the position of the lock sheet 12, second reset members 121 push the lock sheet 12 to a locking position so as to lock the connecting column 30.

3. The handle is rotated to the locking position, a first positioning bead 62 is clamped into a first positioning groove 61, and in this case, the connecting operation on the first box and the second box is completed.

When a box is dismounted, the above steps are reversely operated, which will not be elaborated herein.

Figure 11:
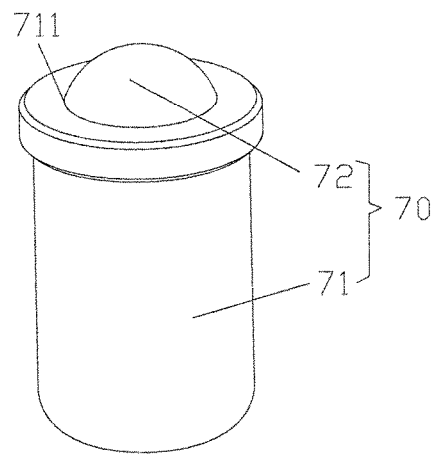
FIG. 11 shows a structural diagram of a second positioning structure in FIG. 1.
Figure 13:
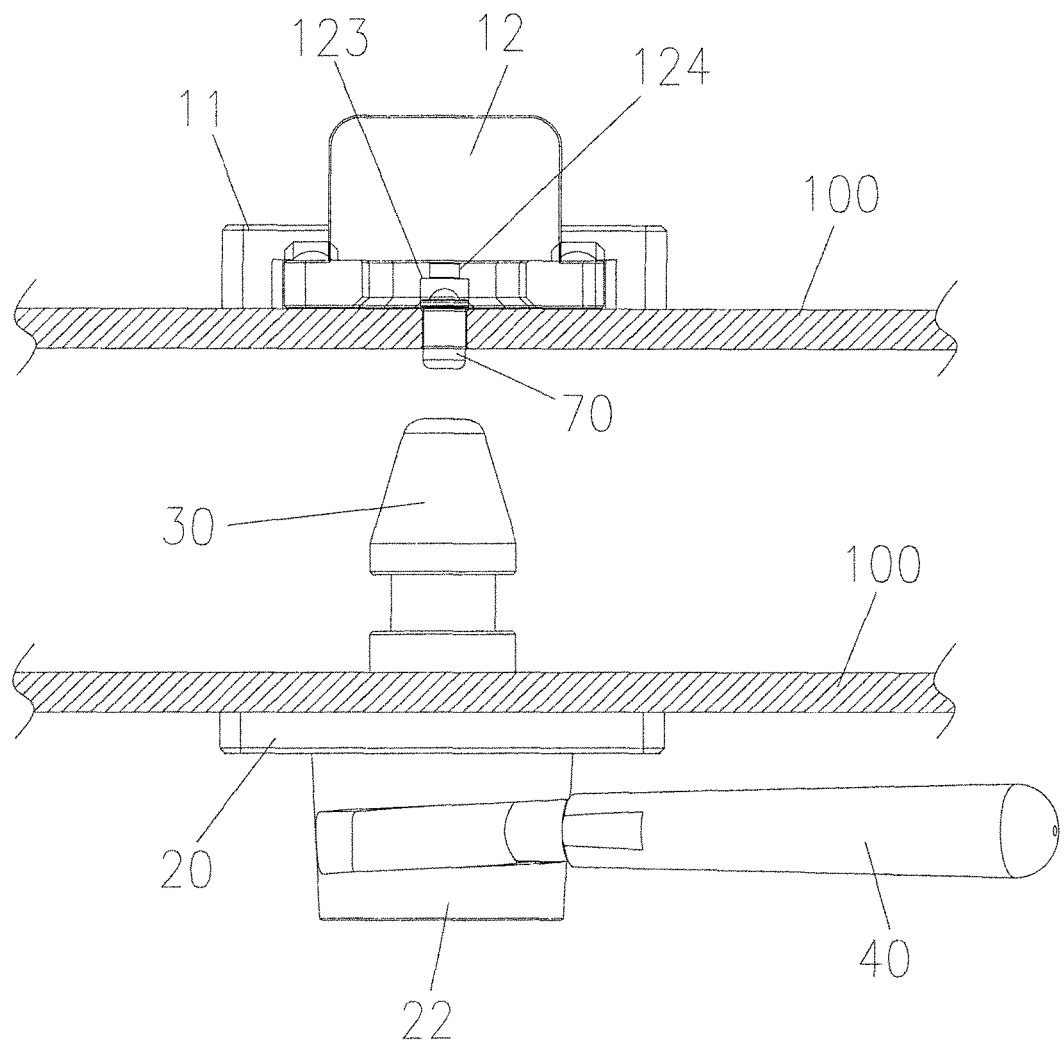
FIG. 13 shows a position diagram of a second positioning structure when adjacent boxes of an LED display device are separated in FIG. 12.

A connecting relationship between the first box and a second positioning structure 70 will be illustrated below. As shown in FIG. 13, the first box is provided with a connecting edge, a through hole is provided on the connecting edge, and a cylinder 71 of the second positioning structure 70 penetrates into the through hole. Meanwhile, a length of the cylinder 71 is greater than a depth of the through hole, and therefore a lower end of the cylinder 71 is protruded from a lower surface of the connecting edge when the lower end of the cylinder 71 is not stressed. In order to prevent the cylinder 71 from disengaging from the through hole, an anti-disengagement structure is provided between the cylinder 71 and the through hole. Specifically, as shown in FIG. 11, an annular convex edge is provided at an upper end of the cylinder 71, and a step section fit to the annular convex edge is provided in the through hole. The structure enables, when the first box and the second box are connected together, the second positioning structure 70 to lock the lock sheet 12, and enables, when the first box and the second box are separated, the second positioning structure 70 not to be fit to the lock sheet 12. A specific process is as follows.

1. As shown in FIG. 13, when the first box and the second box are separated, the lower end of the cylinder 71 is not stressed. In this case, the lower end of the cylinder 71 is protruded from the lower surface of the connecting edge of the first box, and a second positioning bead 72 is not matched with a guide groove 123.

Figure 14:
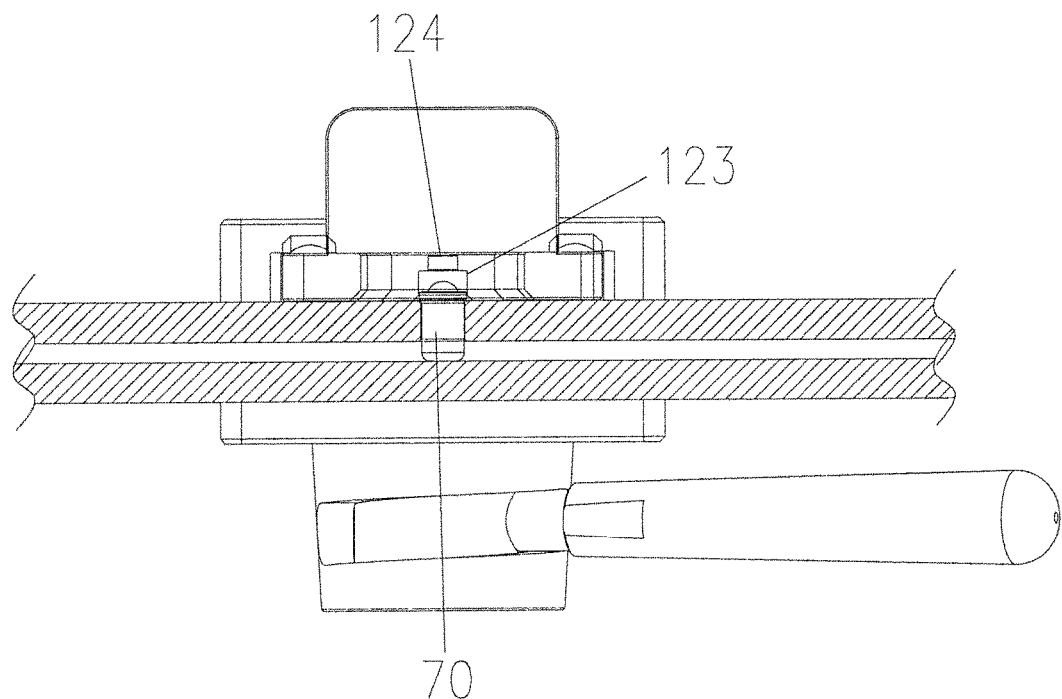
FIG. 14 shows a position diagram of a second positioning structure when adjacent boxes of an LED display device approach each other in FIG. 13.

2. As shown in FIG. 14, when the first box and the second box approach each other gradually, an upper surface of the connecting edge of the second box abuts against a lower surface of the cylinder 71, and as the second box continuously moves up, the cylinder 71 will move up accordingly.

Figure 15:
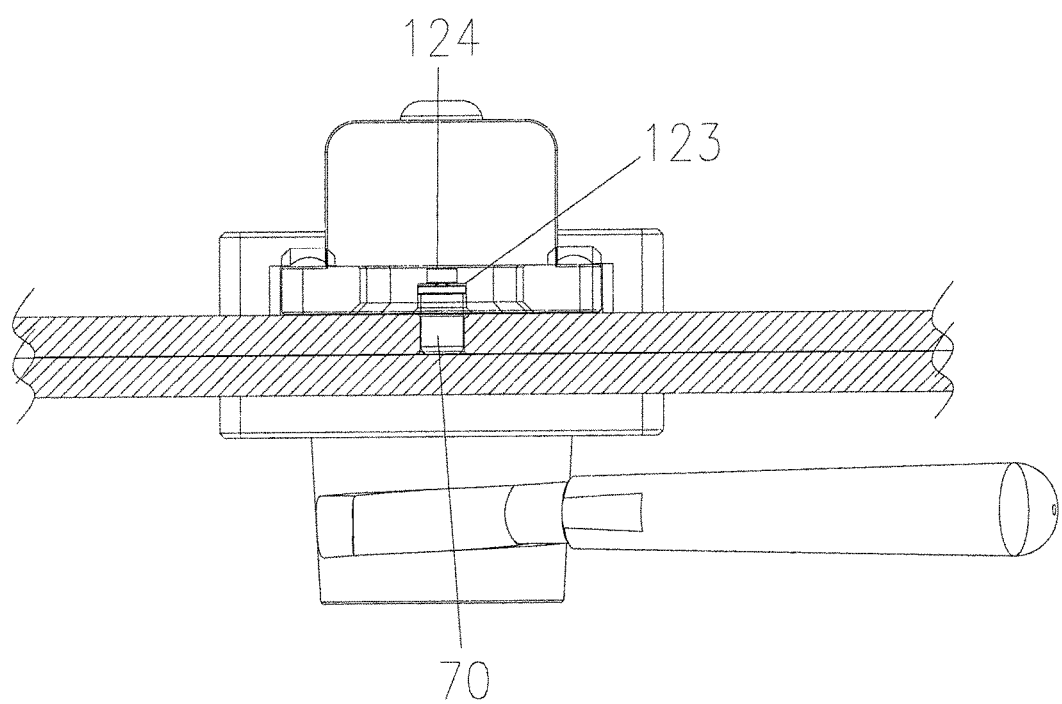
FIG. 15 shows a position diagram of a second positioning structure when adjacent boxes of an LED display device are attached in FIG. 14.

3. As shown in FIG. 15, when the first box and the second box are locked, the connecting edge of the first box and the connecting edge of the second box are attached to each other. In this case, the cylinder 71 is pushed up, the second positioning bead 72 abuts against the bottom of the guide groove 123, and meanwhile, at least a portion of the second positioning bead 72 shrinks into the cylinder 71.

Figure 16:
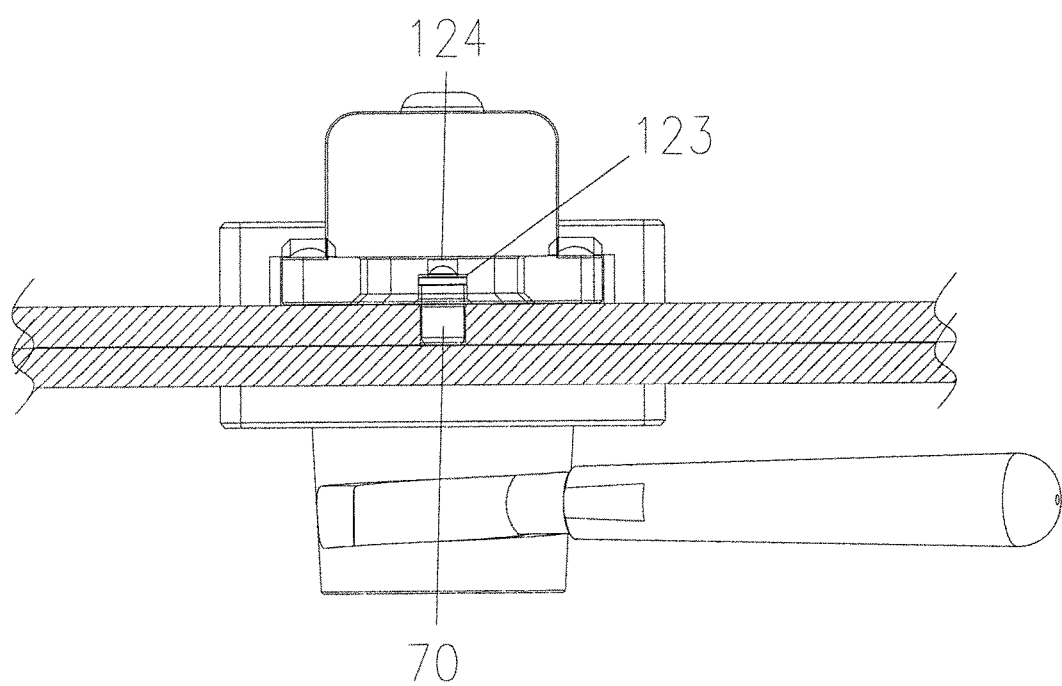
FIG. 16 shows a position diagram of a second positioning structure when a lock sheet of an LED display device is pushed to an unlocking position in FIG. 15.

4. As shown in FIG. 16, when it is necessary to dismount the first box and the second box, the lock sheet 12 is pushed (towards an internal direction of paper) to an unlocking position. In this case, the cylinder 71 exactly slides to a second positioning groove 124 of the guide groove 123, and the second positioning bead 72 springs out under the action of a spring and is embedded into the second positioning groove 124. In this case, the lock sheet 12 is locked by the second positioning bead 72 and the second positioning groove 124 and cannot return, thereby making it convenient for an operator to take the connecting column 30 out.

5. After the first box and the second box are dismounted to be separated, the first box and the second box return to a state shown in FIG. 13. In this case, the cylinder 71 returns under an action of gravity, and the second positioning bead 72 and the second positioning groove 124 are separated and will not be continuously matched with the lock sheet 12.

The above is only the preferred embodiments of the invention, and is not used to limit the invention. There can be various modifications and variations in the invention for those skilled in the art. Any modifications, equivalent replacements, improvements and the like within the spirit and principle of the invention shall fall within the protective scope of the invention.

The invention claimed is:

1. A connecting structure, comprising:
    a first pressing plate, the first pressing plate comprising a plate body and a lock sheet provided on the plate body slidably, a first mounting hole is provided on the plate body;
    a second pressing plate, a second mounting hole is provided on the second pressing plate;
    a connecting column, penetrating through the first mounting hole and the second mounting hole respectively, a lock groove matched with the lock sheet is provided on a first end of the connecting column, a force application part located below the second pressing plate is provided on a second end of the connecting column; and a lifting mechanism, connected to the second pressing plate, the second pressing plate may move towards or away from the first pressing plate under an action of the lifting mechanism by operating the force application part, wherein the force application part is a handle, a sleeve is provided on a surface, away from the first pressing plate, of the second pressing plate so as to form the lifting mechanism, a spiral lifting groove extending in a circumferential direction of the sleeve is provided on a side wall of the sleeve, and the handle penetrates out of the spiral lifting groove, wherein distances between two ends of the spiral lifting groove and the second pressing plate are unequal.

2. The connecting structure according to claim 1, wherein a first positioning structure is provided between the handle and the sleeve.

3. The connecting structure according to claim 2, wherein a third mounting hole extending in a horizontal direction is provided at a second end of the connecting column, the handle penetrates into the third mounting hole, and the first positioning structure comprises:
   a first positioning groove, provided on an inner side wall of the sleeve; and
   a first positioning bead, partially provided in the third mounting hole, a first reset member is provided between the first positioning bead and the handle, the first positioning bead abuts against the inner side wall of the sleeve.

4. The connecting structure according to claim 1, wherein a mounting groove with an opening provided at one end is provided on a lower surface of the plate body, the lock sheet is inserted into the mounting groove through the opening, and a second reset member is provided between the plate body and the lock sheet.

5. The connecting structure according to claim 4, wherein there are two second reset members, the second reset members are springs, spring mounting holes are provided at two sides of the lock sheet, and the springs are provided in the spring mounting holes.

6. The connecting structure according to claim 4, wherein a lock hole matched with the lock groove is provided on the lock sheet, and the lock hole corresponds to the first mounting hole.

7. The connecting structure according to claim 4, wherein a guide groove and a second positioning groove connected with each other are provided on the lock sheet, wherein the second positioning groove is provided at a bottom of the guide groove, the connecting structure further comprises a second positioning structure, and the second positioning structure comprises:
   a cylinder, one end of the cylinder is provided with a fourth mounting hole;
   a second positioning bead, partially provided in the fourth mounting hole; and
   a third reset member, provided between the cylinder and the second positioning bead,
   wherein the cylinder is matched with the guide groove, and the second positioning bead abuts against the bottom of the guide groove.

8. The connecting structure according to claim 4, wherein a vertical operating plate is provided on the lock sheet.

9. The connecting structure according to claim 1, wherein a lock hole matched with the lock groove is provided on the lock sheet, and the lock hole corresponds to the first mounting hole.

10. The connecting structure according to claim 9, wherein a notch portion is provided on a hole wall of the lock hole.

11. The connecting structure according to claim 1, wherein a guide groove and a second positioning groove connected with each other are provided on the lock sheet, wherein the second positioning groove is provided at a bottom of the guide groove, the connecting structure further comprises a second positioning structure, and the second positioning structure comprises:
   a cylinder, one end of the cylinder is provided with a fourth mounting hole;
   a second positioning bead, partially provided in the fourth mounting hole; and
   a third reset member, provided between the cylinder and the second positioning bead,
   wherein the cylinder is matched with the guide groove, and the second positioning bead abuts against the bottom of the guide groove.

12. The connecting structure according to claim 1, wherein a vertical operating plate is provided on the lock sheet.

13. The connecting structure according to claim 1, wherein an inclined guide plane is provided at the first end of the connecting column.

14. A Light-Emitting Diode (LED) display device, comprising a plurality of boxes and a connecting structure provided between adjacent boxes, wherein the connecting structure is the connecting structure according to claim 1.

15. A Light-Emitting Diode (LED) display device, comprising a plurality of boxes and a connecting structure provided between adjacent boxes, wherein the connecting structure is the connecting structure according to claim 3.

16. A Light-Emitting Diode (LED) display device, comprising a plurality of boxes and a connecting structure provided between adjacent boxes, wherein the connecting structure is the connecting structure according to claim 4.

17. A Light-Emitting Diode (LED) display device, comprising a plurality of boxes and a connecting structure provided between adjacent boxes, wherein the connecting structure is the connecting structure according to claim 9.

18. A Light-Emitting Diode (LED) display device, comprising a plurality of boxes and a connecting structure provided between adjacent boxes wherein the connecting structure is the connecting structure according to claim 11.

19. A Light-Emitting Diode (LED) display device, comprising a plurality of boxes and a connecting structure provided between adjacent boxes wherein the connecting structure is the connecting structure according to claim 12.

* * * * *